(12) United States Patent
Sano (10) Patent No.: US 8,931,878 B2
(45) Date of Patent: Jan. 13, 2015

(54) PRINTING APPARATUS AND ROLL PAPER CONVEYANCE CONTROL METHOD

(71) Applicant: Canon Kabushiki Kaisha, Tokyo (JP)

(72) Inventor: Yasuhiko Sano, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/085,299

(22) Filed: Nov. 20, 2013

(65) Prior Publication Data
US 2014/0152733 A1 Jun. 5, 2014

(30) Foreign Application Priority Data

Dec. 5, 2012 (JP) ................................. 2012-266740

(51) Int. Cl.
*B41J 29/393* (2006.01)
*H02P 7/06* (2006.01)

(52) U.S. Cl.
CPC ...................................... *H02P 7/06* (2013.01)
USPC ......................................................... 347/19

(58) Field of Classification Search
None
See application file for complete search history.

(56) References Cited

U.S. PATENT DOCUMENTS

| 7,918,526 B2 * | 4/2011 | Nobuta et al. ................... 347/19 |
| 8,419,154 B2 * | 4/2013 | Igarashi et al. ................. 347/16 |
| 8,801,137 B2 * | 8/2014 | Yoshida et al. ................. 347/16 |

FOREIGN PATENT DOCUMENTS

JP 08-130893 5/1996

* cited by examiner

*Primary Examiner* — Lamson Nguyen
(74) *Attorney, Agent, or Firm* — Fitzpatrick, Cella, Harper & Scinto

(57) ABSTRACT

An embodiment of this invention is directed to suppressing a circuit scale and ensuring quick response in control of a DC motor. According to the embodiment, upon driving the motor to feed roll paper, the current value supplied to drive the motor is compared with a target value for PWM-control. A value representing the comparison result is counted for a PWM-control signal of one cycle. The output tendency of the comparison result is checked based on an obtained count in every cycle of the signal, and the tendency is encoded. The code values are stored for a predetermined number of cycles of the signal. The code values stored in both the first period and the second period longer than the first period are checked in regard to the past tendency of PWM-control, and the signal is adjusted.

17 Claims, 9 Drawing Sheets

PRINTING APPARATUS AND ROLL PAPER CONVEYANCE CONTROL METHOD

BACKGROUND OF THE INVENTION

1. Field of the Invention

The present invention relates to a printing apparatus and roll paper conveyance control method and, particularly, to a printing apparatus which stabilizes, for example, a variation of back-tension in conveyance of roll paper by a conveyance roller, and a roll paper conveyance control method in the apparatus.

2. Description of the Related Art

Torque control of a DC motor in a general circuit configuration is feedback control of compensating for a current value to be applied to the motor by adjusting a voltage applied to a driving circuit so as to supply a desired current based on the result of detection by a detection unit which detects a current value or voltage value applied to the motor.

As torque control of a DC motor having this configuration, for example, Japanese Patent Laid-Open No. 8-130893 discloses a method of estimating a rotational position and rotational speed by a current sensor and voltage sensor, and performing control based on the estimated values. The estimated values of the rotational position and rotational speed at this time are compared with those of a rotational position and rotational speed at the previous time. If the comparison result reveals that the change exceeds a predetermined reference change amount, it is determined that noise has been mixed in the sensors and an error has occurred. Then, the estimated values at this time are replaced with alternative values, thereby preventing degradation of operation stability caused by superimposition of noise.

However, the conventional DC motor control circuit has the following problems.

For example, in Japanese Patent Laid-Open No. 8-130893, the moving average of an average load torque is used to calculate the estimated values of a rotational position and rotational speed. When the moving average period is short and large noise is mixed in the feedback control system, no accurate control can be achieved because the influence of the noise on the moving average value is serious. When the moving average period is long, noise tolerability is improved, but traceability to a small variation is impaired.

Since a complicated algorithm is used to calculate an estimated value, an error occurs in calculation by the CPU and the circuit scale is expanded.

SUMMARY OF THE INVENTION

Accordingly, the present invention is conceived as a response to the above-described disadvantages of the conventional art.

For example, a printing apparatus and roll paper conveyance control method according to this invention are capable of improving traceability to a load variation while maintaining the stability of a DC motor when the DC motor is used as a printing medium conveyance driving source.

According to one aspect of the present invention, there is provided a printing apparatus which feeds a printing medium by driving a DC motor, and prints. The apparatus comprises: a comparison unit configured to compare a current value of a current supplied to drive the DC motor with a target value for driving the DC motor by PWM control; a count unit configured to count a value representing a result of comparison by the comparison unit for a PWM control signal of one cycle; an encoding unit configured to check an output tendency of the result of comparison by the comparison unit based on a count value obtained by the count unit in every cycle of the PWM control signal, and encode the tendency as a code; a storage unit configured to store values of codes obtained by encoding by the encoding unit for a predetermined number of cycles of the PWM control signal; and a control unit configured to check values of codes stored in the storage unit in both a first period and a second period longer than the first period in regard to a past tendency of PWM control, adjust the PWM control signal, and control driving of the DC motor based on the adjusted PWM control signal.

According to another aspect of the present invention, there is provided a roll paper conveyance control method in a printing apparatus which includes a DC motor for feeding a printing medium, and drives the DC motor by PWM control to print on the fed printing medium. The method comprises: comparing a current value of a current supplied to the DC motor with a target value for PWM control; counting a value representing a result of the comparison for a PWM control signal of one cycle; checking an output tendency of the result of comparison based on a count value in every cycle of the PWM control signal; encoding the tendency as a code; storing, in a storage unit, values of the encoded codes for a predetermined number of cycles of the PWM control signal; and checking values of codes stored in the storage unit in both a first period and a second period longer than the first period in regard to a past tendency of PWM control to adjust the PWM control signal and control driving of the DC motor based on the adjusted PWM control signal.

The invention is particularly advantageous since the output tendency of the comparison result between a current value supplied to the DC motor and a target value is checked in every cycle of a PWM control signal, the tendency is expressed as a code, and the PWM control signal can be adjusted based on the code value. Even if small noise is mixed in detection of the current, it does not influence PWM control, and tolerability against noise can be improved.

The PWM control signal is adjusted in consideration of code values stored in a storage unit in both the first period and the second period longer than the first period in regard to the past tendency of PWM control. Even if relatively large noise is mixed, the influence of the noise can be minimized. As a result, PWM control of the DC motor with good traceability can be implemented.

Further features of the present invention will become apparent from the following description of exemplary embodiments (with reference to the attached drawings).

DESCRIPTION OF THE EMBODIMENTS

An exemplary embodiment of the present invention will now be described in detail in accordance with the accompanying drawings. Note that the same reference numerals denote the same parts already described, and a description thereof will not be repeated.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Figure 1:
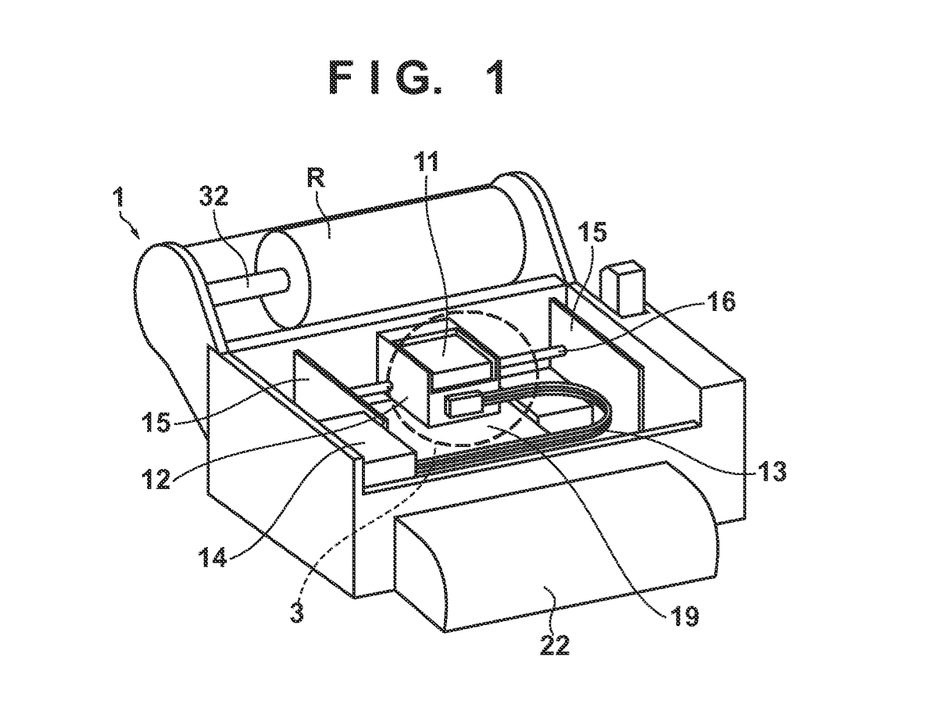
FIG. 1 is a perspective view showing the schematic arrangement of an inkjet printing apparatus as an exemplary embodiment.
Figure 2:
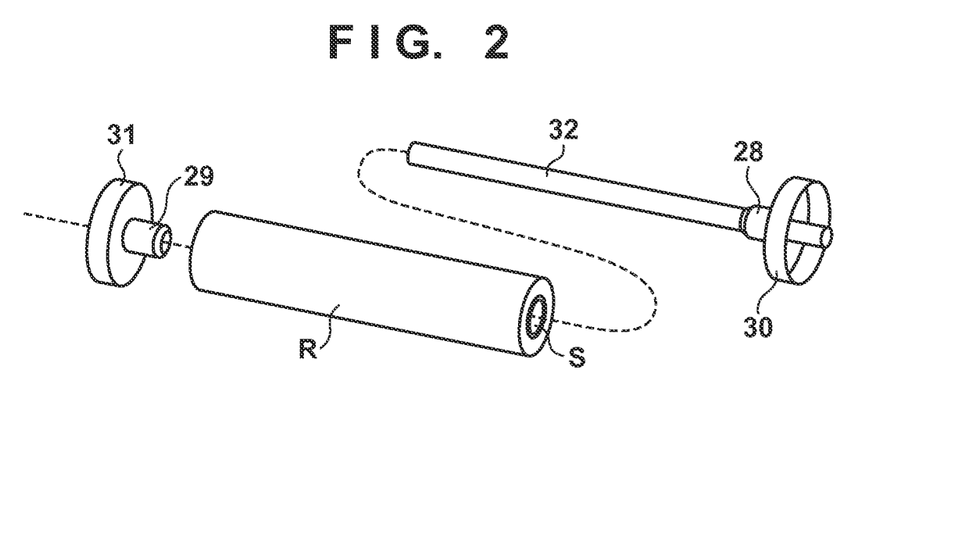
FIG. 2 is a perspective view showing the arrangement of a roll paper spool portion in FIG. 1.
Figure 3:
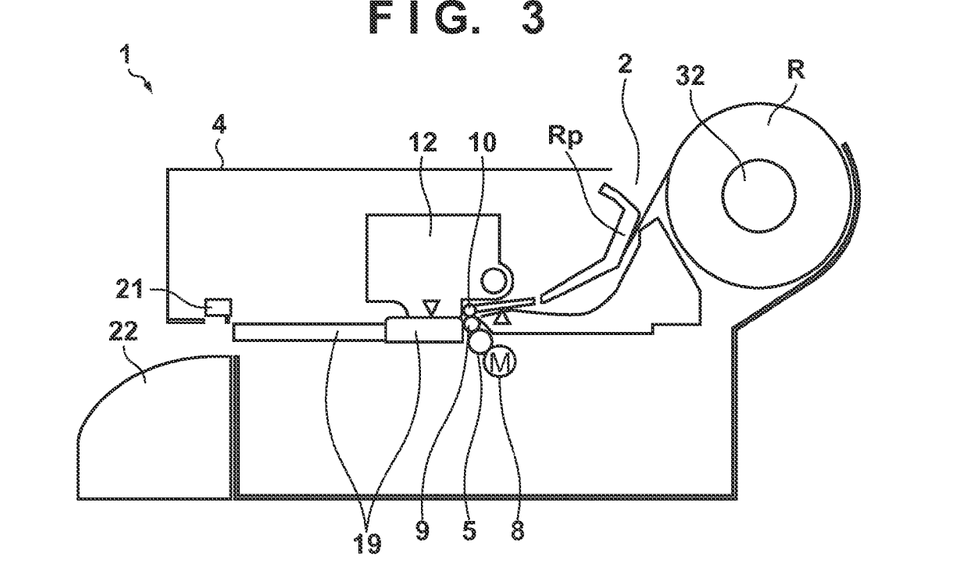
FIG. 3 is a side sectional view showing the schematic arrangement of the printing apparatus including a feeding mechanism for roll paper shown in FIG. 1.

FIG. 1 is a perspective view showing the schematic arrangement of an inkjet printing apparatus (to be referred to as a printing apparatus hereinafter) including a feed mechanism for roll paper as an exemplary embodiment. FIG. 2 is a perspective view showing the arrangement of a roll paper spool portion in FIG. 1. FIG. 3 is a side sectional view showing the schematic arrangement of the printing apparatus including the roll paper feeding mechanism shown in FIG. 1.

First, an operation to set roll paper as a printing medium will be explained.

As a printing medium, the embodiment adopts roll paper R which is rolled continuous paper. As shown in the perspective view of FIG. 2, a spool shaft 32 is inserted through a paper tube S of the roll paper R at the winding center. A loading portion 28 of a reference-side roll paper holder 30 on the spool shaft 32 is dug into the inner wall of the paper tube S by a radial elastic force to fix and hold the roll paper R. The reference-side roll paper holder 30 is fixed not to rotate with respect to the spool shaft 32.

Further, a non-reference-side roll paper holder 31 is fitted on the spool shaft 32 from a side opposite to the reference-side roll paper holder 30, and is set on the paper tube S to sandwich the roll paper R. The non-reference-side roll paper holder 31 also includes a loading portion 29, and is fixed and held with respect to the paper tube S by a radial elastic force. Then, as shown in FIG. 1, the two ends of the spool shaft 32 are rotatably supported by a main body 1 of the printing apparatus, and the roll paper R is also rotatably held. In the following description, $R_p$ is the leading end of the roll paper R.

Next, a feed operation will be explained.

The user guides, to a conveyance port 2, the leading end $R_p$ of the roll paper R set at the position shown in FIG. 3. The user rotates the roll paper R in a counterclockwise (CCW) direction to feed downstream the leading end $R_p$ of the roll paper R through a conveyance path. A reflection paper detection sensor is arranged midway along the conveyance path. When the paper detection sensor detects the passage of the leading end $R_p$ of the roll paper R, a conveyance motor (LF motor) 8 starts rotating a conveyance roller (LF roller) 9 in the CCW direction which is a paper conveyance direction.

The leading end $R_p$ of the roll paper R subsequently fed downward by the user reaches the nip between a pair of the conveyance roller 9 and a conveyance roller 10, and the paper is conveyed on a platen 19 while nipped by the pair of conveyance rollers 9 and 10. At this time, an end detection sensor (not shown) mounted in a carriage 12 detects the passage of the paper, and confirms that the paper has reliably reached the platen. In a subsequent operation, the pair of conveyance rollers 9 and 10 automatically performs paper conveyance. At this time, the user releases the roll paper.

Next, image formation on the roll paper R conveyed to the platen 19 will be explained.

The main body 1 of the printing apparatus includes an image printing unit surrounded by a broken line 3 in FIG. 1. The image printing unit 3 includes an inkjet printhead (to be referred to as a printhead hereinafter) 11, the carriage 12 on which the printhead 11 is mounted, and the platen 19 arranged to face the printhead 11.

The printhead 11 includes a plurality of nozzle arrays (not shown) in the roll paper conveyance direction on a surface facing the printing surface, and discharges inks of different colors from the respective nozzle arrays. The inks of the respective colors are supplied from ink tanks 14 to the nozzles of the respective colors on the printhead 11 via respective ink supply tubes 13. The carriage 12 is slidably supported along a guide shaft 16 and a guide rail (not shown) which have fixed at two ends to frames 15 of the main body 1 and are arranged parallel to each other.

While the carriage 12 is reciprocated, the printhead 11 discharges ink to the roll paper conveyed to the image printing unit 3, thereby printing an image on the roll paper. When the image is printed by forward scan or backward scan of the carriage 12, the pair of conveyance rollers 9 and 10 conveys the roll paper by a predetermined pitch in the conveyance direction, and the carriage 12 is moved again to print an image of the next line. In this manner, intermittent conveyance of the roll paper is repeated to print an image on the roll paper, and the printed portion is conveyed to a discharge tray 22. After the end of image printing, the roll paper is conveyed to a predetermined cutting position by the pair of conveyance rollers 9 and 10, and is cut by a cutter 21.

A series of operations from setting to discharge of roll paper has been described.

Figure 4:
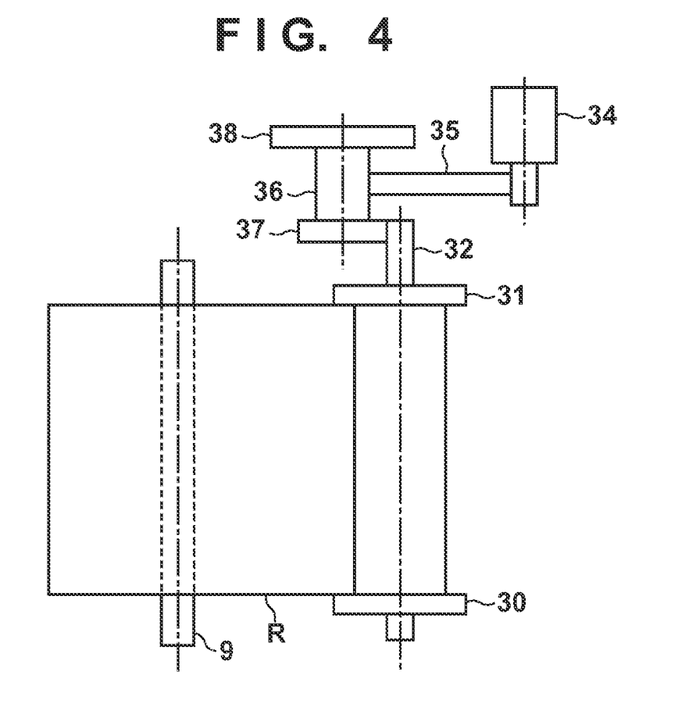
FIG. 4 is a plan view schematically showing the arrangement of a roll paper feeding mechanism.

FIG. 4 is a plan view schematically showing the arrangement of the roll paper feeding mechanism. The roll paper feeding mechanism includes a feed motor 34 which applies a driving force to the roll paper R, gear arrays 35 to 37 which transmit the driving force of the feed motor 34 to the spool shaft 32, and a feed encoder 38. With this arrangement, the spool shaft 32 rotates to rotate the roll paper R and feed it to the pair of conveyance rollers 9 and 10.

Figure 5:
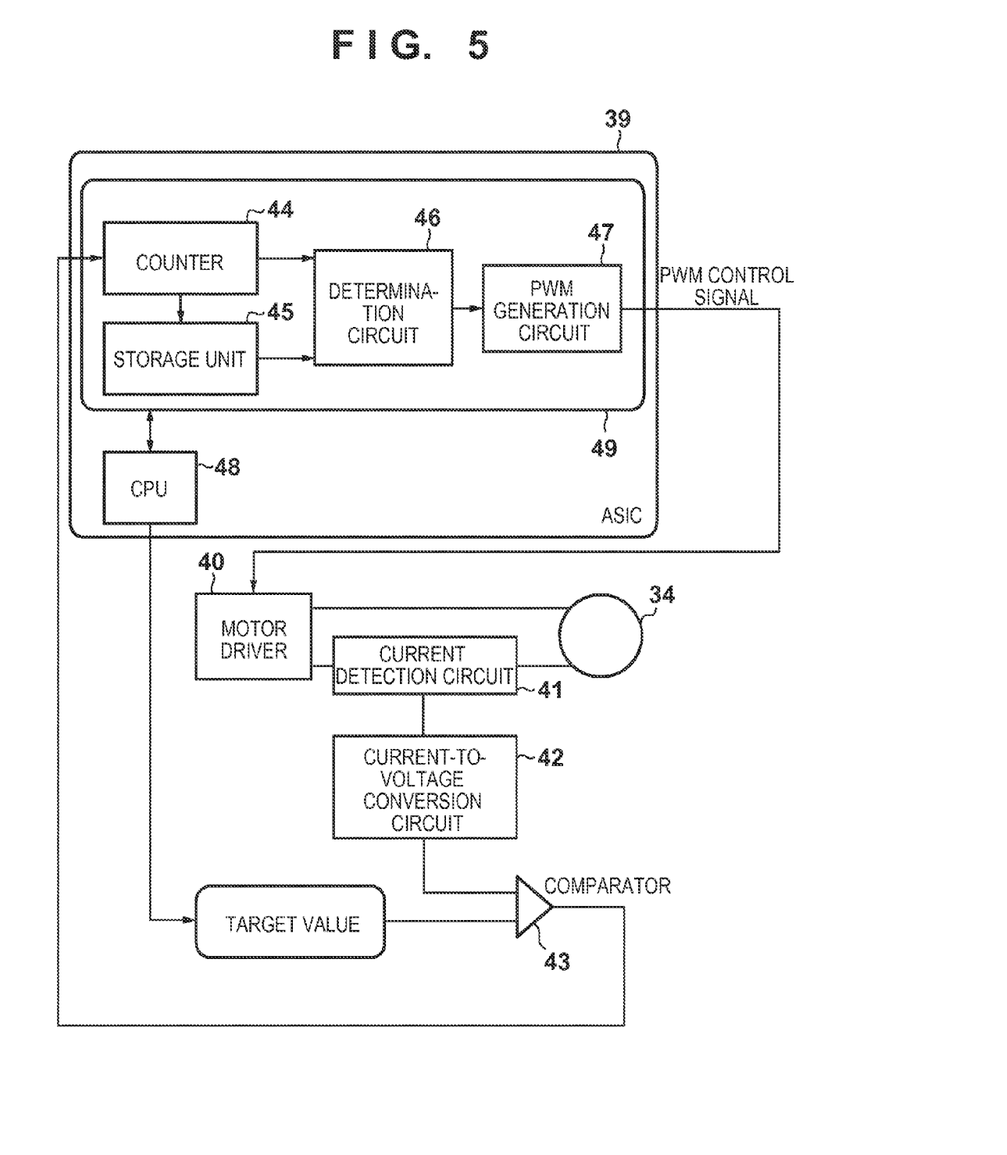
FIG. 5 is a block diagram showing a DC motor control circuit.

FIG. 5 is a block diagram showing the arrangement of a DC motor control unit which controls a back-tension control motor used in feeding control of roll paper in the printing apparatus shown in FIG. 1.

In the embodiment, the feed motor 34 is used as the back-tension control motor. As the feed motor, a DC motor is used. A motor driver 40 drives the DC motor 34. An ASIC 39 performs PWM control for the motor driver 40.

A current detection circuit 41 detects a current supplied to the DC motor 34. A current-to-voltage conversion circuit 42 converts the detected current value into a voltage value, and inputs the voltage value to one terminal of a comparator 43. The other terminal of the comparator 43 receives a target value from the ASIC 39 (directly from a CPU 48), and the comparator 43 outputs the comparison result. A counter 44 receives the comparison result from the comparator 43, and counts the high- or low-level period of the output digital signal based on source oscillation clocks. A storage unit (memory or register) 45 holds, by a plurality of cycles, codes each representing whether a value obtained by counting a PWM control signal in one cycle by the counter 44 is positive, 0, or negative. This processing will be called encoding.

Based on the values held by the counter 44 and storage unit (memory or register) 45, a determination circuit 46 determines whether to increase, decrease, or keep unchanged the pulse width of a PWM control signal in the next cycle. Based on the result of determination by the determination circuit 46, a PWM generation circuit 47 outputs a PWM control signal for the next cycle to the motor driver 40.

Note that the CPU 48 is arranged inside or outside the ASIC 39, controls a DC motor control unit 49 including the counter 44, storage unit 45, determination circuit 46, and PWM generation circuit 47, and instructs the start/stop of inputting a PWM driving signal to the motor driver 40. As described above, the CPU 48 also sets a target value to be input to the comparator 43.

Figure 6:
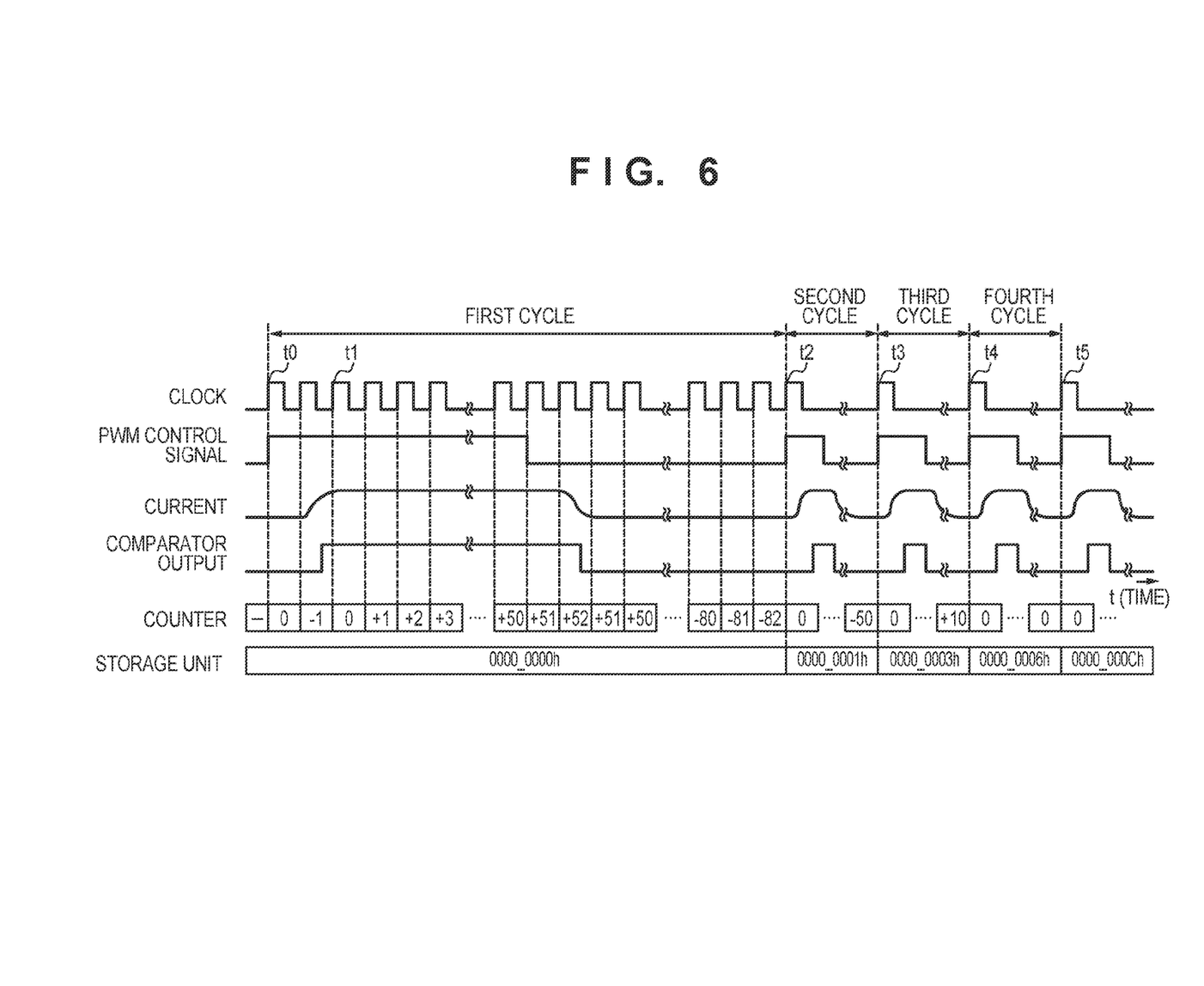
FIG. 6 is a timing chart showing the basic operation of the DC motor control circuit.

FIG. 6 is a timing chart for explaining the operations of the counter 44 and storage unit 45 for the PWM control signal of one cycle.

When a driving start instruction is received from the CPU 48 at time t=t0, the PWM generation circuit 47 outputs a PWM control signal to the motor driver 40 in accordance with a rotational direction and initial pulse width similarly designated by the CPU 48. When the PWM control signal goes high, the motor driver 40 drives the DC motor 34 for back-tension control, and a positive current starts flowing. When the current value exceeds a target value set in advance by the CPU 48, an output from the comparator 43 goes high. At this time, based on source oscillation clocks, the counter 44 counts the high- or low-level period of the comparator output. The counter 44 increments the count value by "1" when the comparator output is at high level, and decrements it by "1" when the comparator output is at low level.

In the example shown in FIG. 6, the count value is "0" at time t=t0, the comparator output is low at the next clock, and thus the count value is decremented by "1" to be "−1". At time t=t1, the comparator output is high, and the count value is incremented by "1" to be "0". When the PWM control signal goes low, the motor driver 40 drives the DC motor 34 to supply a current in the opposite direction. If the current becomes smaller than the target value, the output from the comparator 43 goes low, and the counter 44 decrements the count value by "1". This operation is repeated for the PWM control signal of one cycle. At time t=t2, the count value becomes "−82".

At this time, the code (0 when the count value is positive or 0, and 1 when it is negative) of the count value is held at the least significant bit of the storage unit 45 (32-bit register in the embodiment). In this case, the code "1" corresponding to the count value "−82" is held, and the register value of the storage unit 45 becomes 0000_0001h.

After the PWM control signal proceeds by one cycle from time t=t2 to time t=t3, the count value becomes "−50". At this time, the storage unit 45 shifts the set value ("1" at the least significant bit (LSB) in this case) to an upper bit by 1 bit, and substitutes the code "1" corresponding to the count value "−50" into the LSB. As a result, the storage unit 45 holds 0000_0003h. Similarly, at time t=t4, the count value becomes "+10", and the storage unit 45 shifts the set bits to upper bits by 1 bit and substitutes the code "0" corresponding to the count value "+10" into the least significant bit. Thus, the storage unit 45 holds 0000_0006h. At time t=t5, the count value becomes "0", and the bits set in the storage unit 45 are shifted to upper bits by 1 bit, and the code "0" corresponding to the count value "0" is substituted into the least significant bit. The storage unit 45 holds 0000_000Ch. Subsequently, the same operation is performed.

In this fashion, in the 32-bit register of the storage unit 45, pieces of information reflecting comparison results of PWM control signals of 32 cycles are stored at the respective bits of the register.

Next, processing of controlling back-tension of roll paper by PWM-controlling the DC motor based on the count value of the counter 44 and information stored in the storage unit 45 will be explained with reference to flowcharts and timing charts.

Figure 7A:
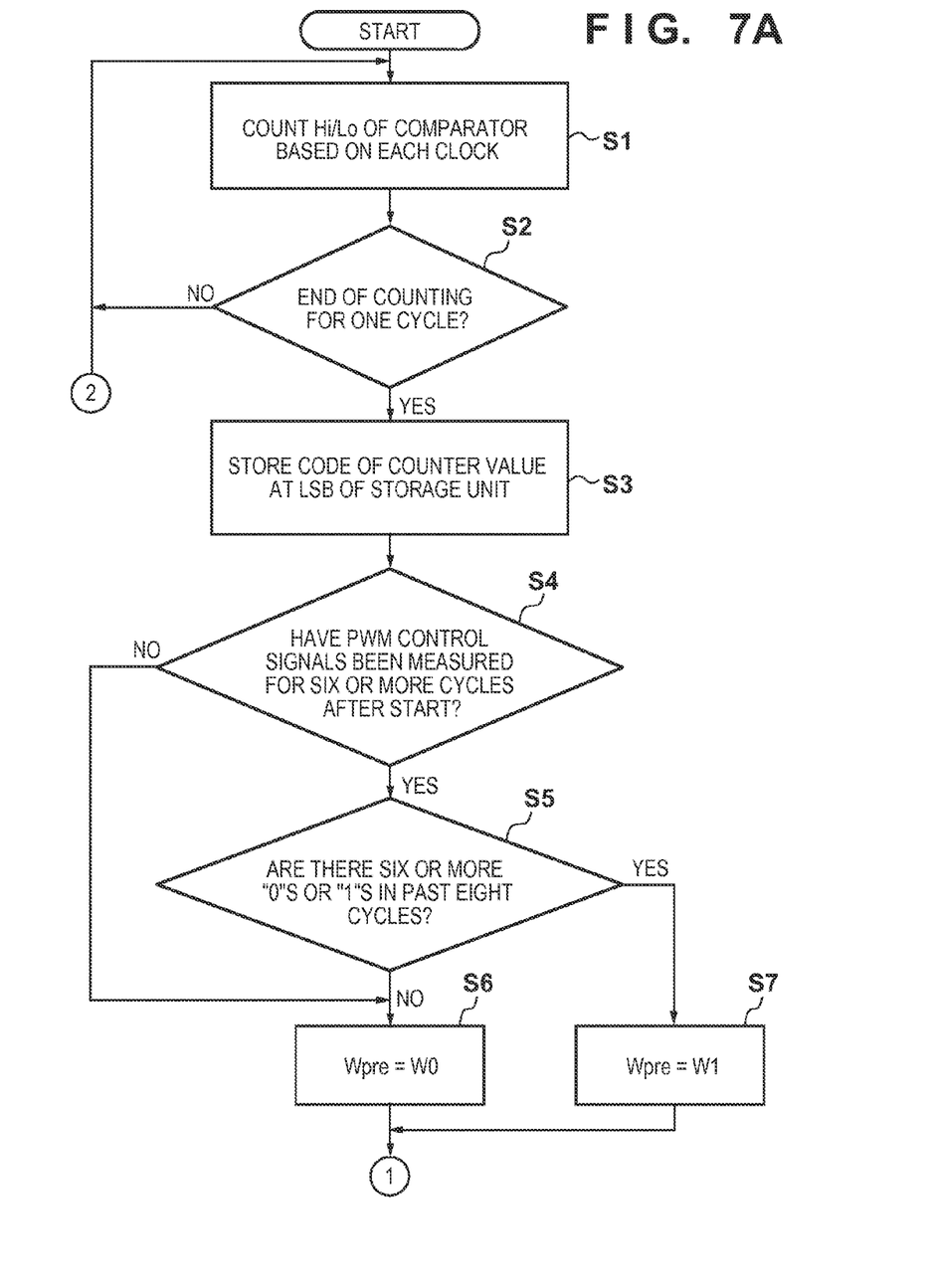
FIGS. 7A and 7B are flowcharts showing the control sequence of the DC motor control circuit.
Figure 7B:
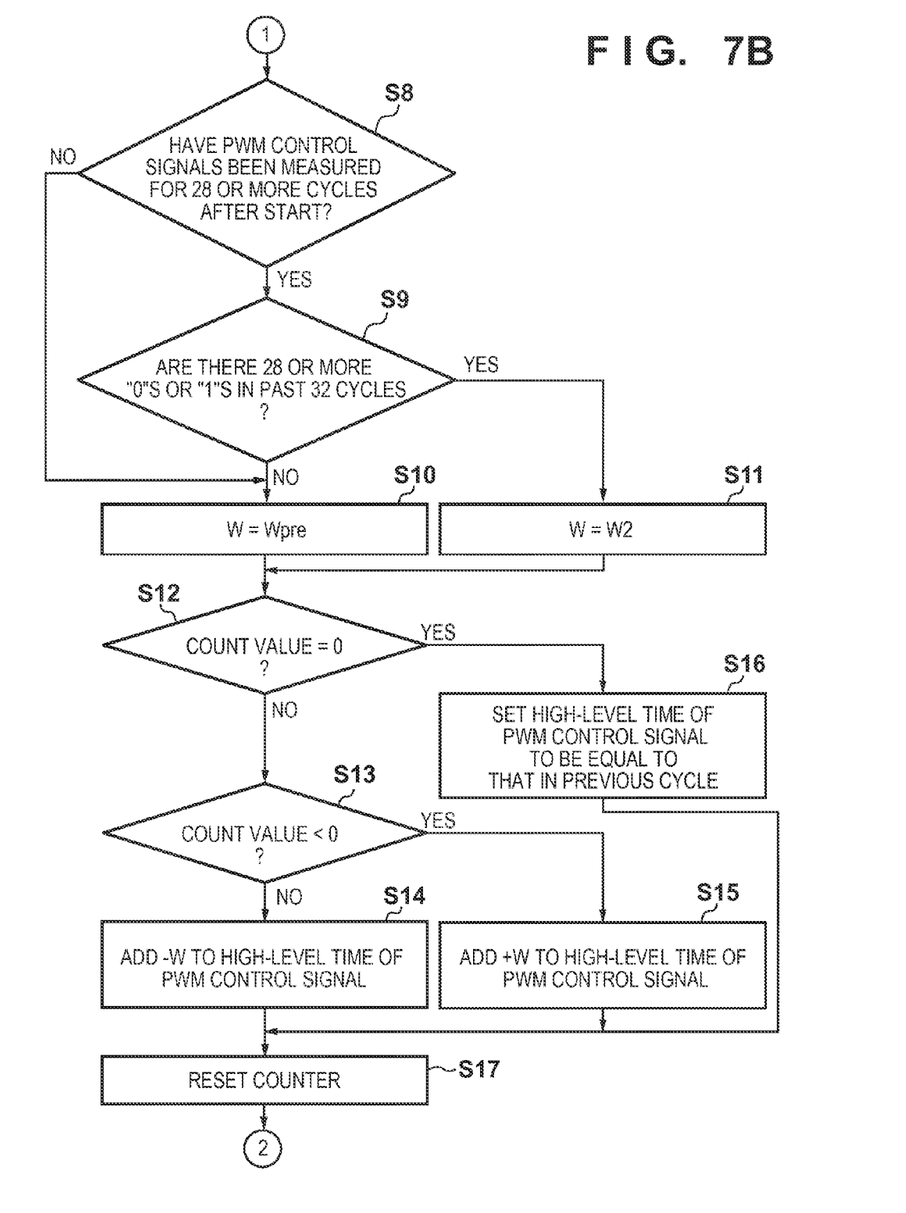

FIGS. 7A and 7B are flowcharts showing PWM control of the DC motor 34 for back-tension control. FIGS. 8A to 8D are timing charts showing a temporal change of the PWM control signal, the counter value, and a value set in the storage unit during execution of PWM control. FIGS. 8A to 8D do not show the source oscillation clock. As for the counter value, only a final value counted based on the final source oscillation clock in every cycle of the PWM control signal is shown.

An operation especially in a case where there are three trace values for the normal mode, first acceleration mode, and second acceleration mode will be described. The trace value is defined as a value which determines how much the high-level period of a PWM control signal in the next cycle is increased with respect to the high-level period of a PWM control signal in the current cycle.

Figure 8A:
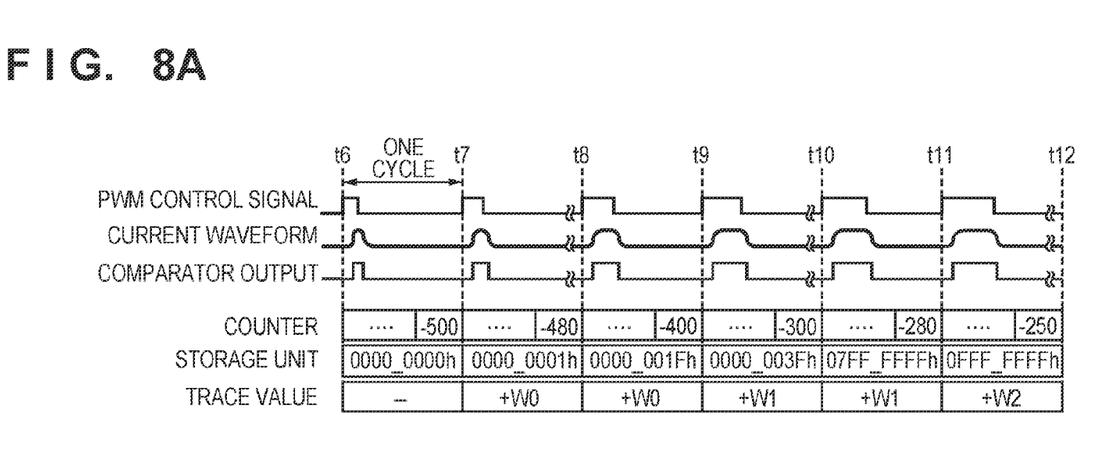
FIGS. 8A, 8B, 8C, and 8D are timing charts showing a temporal change of the PWM control signal, the counter value, and a value set in a storage unit during execution of PWM control.

First, at time t=t6, the PWM control signal is applied with a pulse width in a given initial state. A current flows in accordance with the PWM control signal, and the comparator 43 outputs a comparison result in accordance with the current. In step S1, based on each source oscillation clock, the counter 44 adds "+1" when the output from the comparator 43 is high, and "−1" when it is low. Then, in step S2, it is checked whether or not the counting of the PWM control signal of one cycle has ended. If the counting continues, the process returns to step S1; if the counting has ended, advances to step S3.

In step S3, a value set in the storage unit 45 at the time (time t=t7) when the output from the comparator 43 was counted for the PWM control signal of one cycle is shifted to upper bits by one bit. Then, a code (0 when the count value is positive or 0, and 1 when it is negative) corresponding to the current count value is stored at the LSB of the storage unit 45. In a case shown in FIG. 8A, the count value at time t=t7 is −500, the code "1" is stored at the LSB of the storage unit 45, and the storage unit 45 holds 0000_0001h.

FIG. 8A is a timing chart showing an operation especially when no external noise is mixed.

In step S4, it is determined whether or not PWM control signals have been measured for six or more cycles after the start of the operation. At time t=t7, the number of cycles after the start of the operation is smaller than six, so the process advances to step S6 to set W0 as a provisional trace value Wpre. In step S8, similar to step S4, it is checked whether or not PWM control signals have been measured for 28 or more cycles after the start of the operation. At time t=t7, the number of cycles after the start of the operation is smaller than 28, and thus the process advances to step S10 to set Wpre as a trace value W (W0 at time t=t7).

The process then advances to step S12 to check whether or not the count value is "0" and to step S13 to check whether or not the count value is negative. The code of the trace value W is decided or the trace value is set to 0, and it is decided whether or not to set the PWM duty to be equal to that in the previous cycle. In FIG. 8A, the count value at time t=t7 is −500, and the process advances to step S15 to set the final trace value to be +W0. The case in which PWM control is performed based on this trace value is a case in which the operation is performed in the normal mode.

That is, at time t=t7, a PWM control signal is output by setting the high-level period of the PWM control signal in the next cycle after time t=t7 to be longer by +W0 than the high-level period of the PWM control signal output during a time period between time t=t6 and t7. After the trace value in the next cycle is decided, the counter is reset in step S17, and the same control is executed again in the next cycle.

The above-described processing is executed for PWM control signals of five cycles. If the counter value is negative in all these cycles, the storage unit 45 holds 0000_001Fh immediately before time t=t9. At time t=t9, the code "1" corresponding to the count value "−400" of the counter 44 is substituted into the LSB, and the value of the storage unit 45 becomes 0000_003Fh.

At this time, the conditional determination in step S4 becomes YES, and the process advances to step S5. In step S5, the history of the past eight cycles, that is, the values of lower 8 bits in the storage unit 45 are confirmed. If there are six or more "0"s or "1"s in the lower 8 bits, the process advances to step S7 to set the provisional trace value Wpre to be W1 (W1>W0). At time t=t9, there are six "1"s, so the provisional trace value Wpre=W1 is set. After that, the process advances to step S8. At this time, PWM control signals have been measured for only six cycles, so the process advances to step S10 to set the trace value W to be W=Wpre (=W1). The trace direction is decided in steps S12 and S13, and the process advances to step S15 to set the final trace value to be +W1 at time t=t9. In this case, W1>W0. Thus, in a case where PWM control is performed based on this trace value, the operation shifts to the first acceleration mode.

Subsequently, PWM control signals of 27 cycles are measured in the same way. If the counter value remains negative till time t=t10, it is controlled to prolong the high-level period of the PWM control signal with the trace value "+W1". In FIG. 8A, the value of the storage unit 45 is 07FF_FFFFh at time t=t10. At time t=t11, the code "1" corresponding to the count value "−280" of the counter 44 is set at the LSB, and the value of the storage unit 45 becomes 0FFF_FFFFh.

According to the processing of the flowcharts of FIGS. 7A and 7B, the determinations in steps S4 and S5 become YES, and the process advances to step S7 to set Wpre=W1. Since PWM control signals have been measured for 28 or more cycles after the start of the operation, the determination in step S8 becomes YES and the process advances to step S9. In step S9, the history of past 32 cycles, that is, the values of all the bits of the storage unit 45 are confirmed. If there are 28 or more "0"s or "1"s in these bits, the process advances to step S11 to set the trace value W to be W2 (W2>W1>W0). At time t=t11, there are 28 "1"s, so the process advances to step S11 to set the trace value W=W2. The trace direction is decided in steps S12 and S13, and the process advances to step S15 to set the final trace value to be +W2 at time t=t11. In this case, W2>W1>W0. Hence, in a case where PWM control is performed based on this trace value, the operation shifts to the second acceleration mode. The same control is executed until the trace value is asymptotic to a preset trace value.

FIGS. 9A to 9D are timing charts showing a state (traceability) in which the count value of the counter is asymptotic to a target value. In FIGS. 9A to 9D, the abscissa represents the time, the ordinate represents the count value, and the count value=0 is set as the target value. The same reference numerals as those in FIGS. 8A to 8D denote the same times.

Figure 9A:
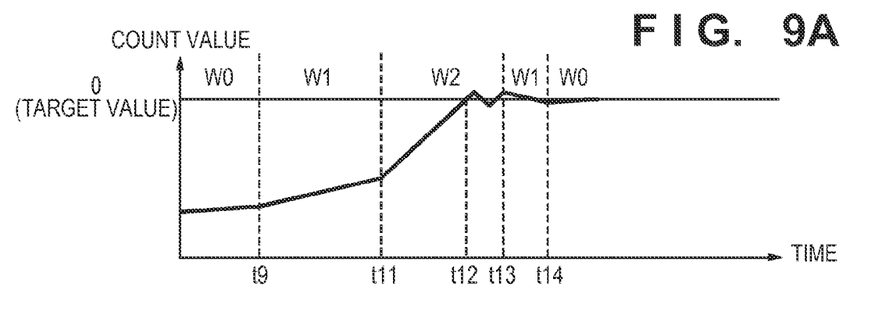
FIGS. 9A, 9B, 9C, and 9D are timing charts showing a state (traceability) in which the count value of a counter is asymptotic to a target value.

In particular, FIG. 9A is a timing chart showing a trace state to the target value when no external noise is mixed.

In FIG. 9A, the trace value becomes W1 at time t=t9 and W2 at time t=t11, and is asymptotic to the target value increasingly. At time t=t12, the count value becomes positive, and the trace direction is reversed. Since the determination in step S9 of FIGS. 7A and 7B becomes YES, the trace value becomes −W2. The same operation continues, the conditional determination in step S9 of FIGS. 7A and 7B becomes NO at time t=t13, and the trace value becomes −W1. Further, the same operation continues, the determination in step S5 of FIGS. 7A and 7B becomes NO at time t=t14, and the trace value becomes +W0. Thereafter, the trace value becomes ±W0 (the sign changes depending on the code of the counter value) near the target value, and is settled in the steady state.

Figure 8B:
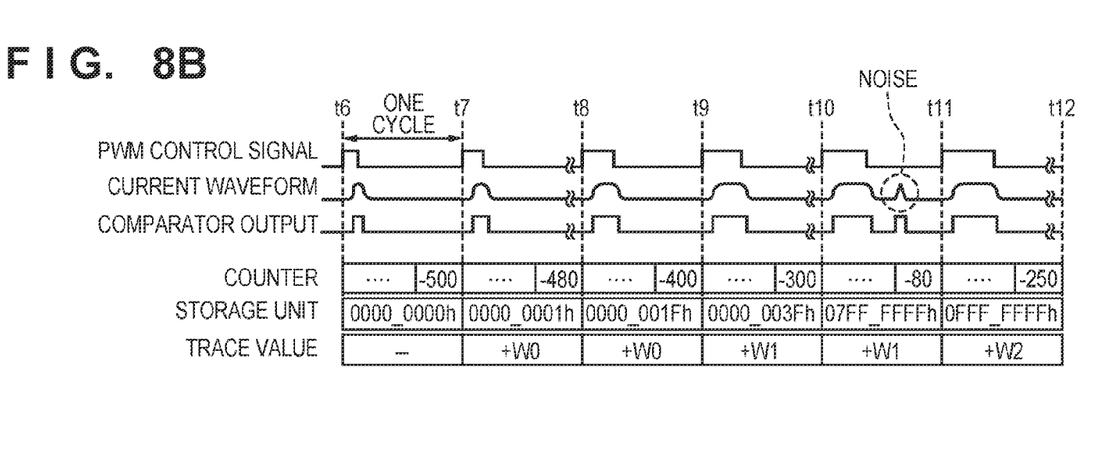
Figure 9B:
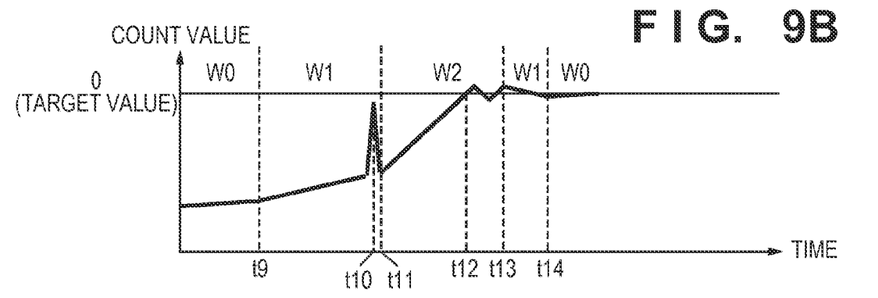

FIGS. 8B and 9B are timing charts when relatively small noise is mixed in a current supplied to the DC motor 34 in one cycle from time t=t10, and show a state in which the counter value is asymptotic to the target value. In FIGS. 8B and 9B, the same reference numerals as those described above in FIGS. 8A and 9A denote the same times.

As shown in FIGS. 8B and 9B, if noise is mixed in the current waveform in an interval between time t=t10 and t11, the output from the comparator 43 goes high while the noise is mixed. The counter value is also influenced and becomes −80 at this time, unlike the counter value (−280 at t=t11 in FIG. 8A) when no noise is mixed.

If the trace value is calculated according to the flowcharts of FIGS. 7A and 7B by using the counter value "−80", the same determination as that when no noise is mixed is made, and the trace value W=+W2 at next time t=t11. According to this embodiment, even if noise is mixed in the current waveform, the count value can trace the target value without being influenced by noise as long as the code of the counter value is not influenced. As a result, the target value trace time does not change at all, compared to the case in which no noise is mixed.

An advantage achieved by the embodiment will be further explained by using an example complying with the conventional technique as a comparative example.

Figures 8C, 8D:
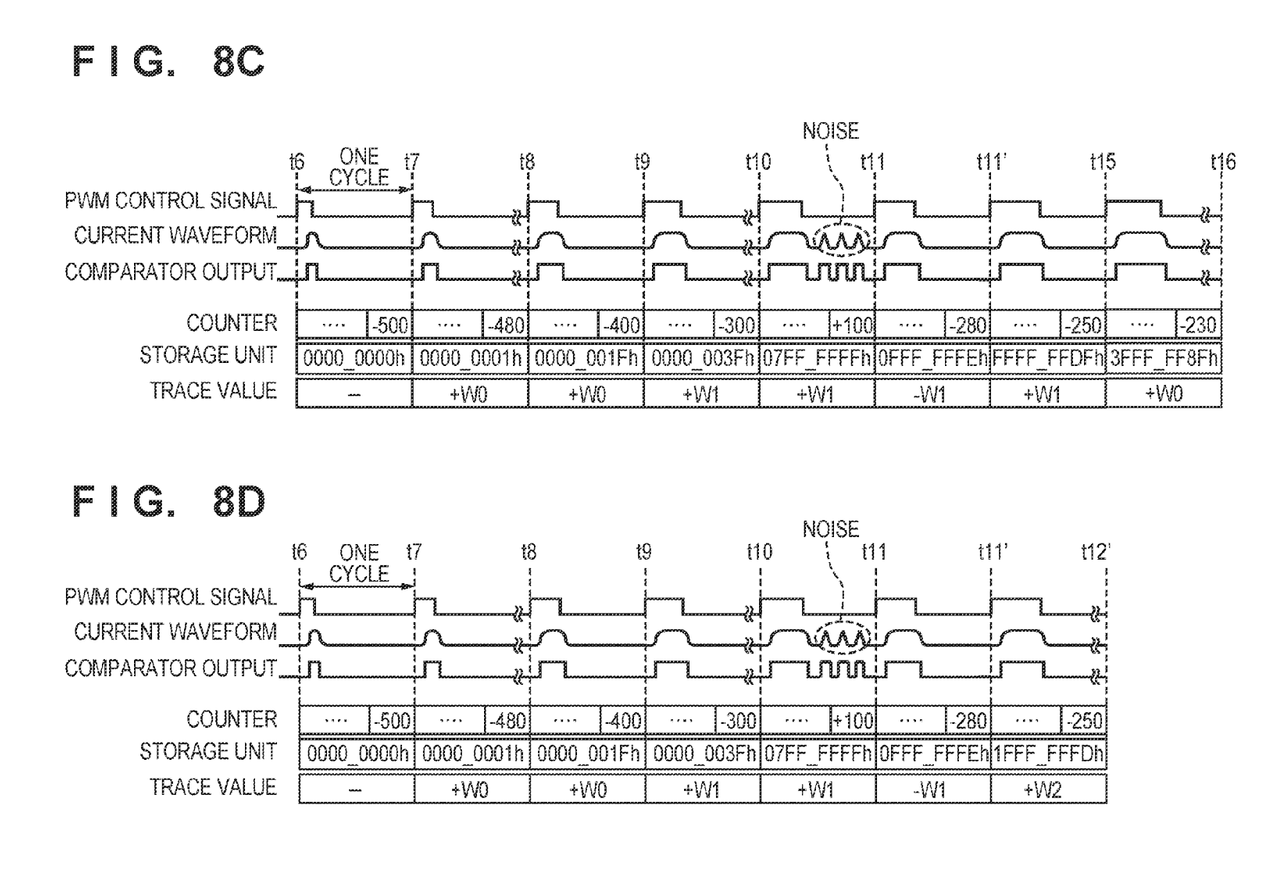
Figure 9C:
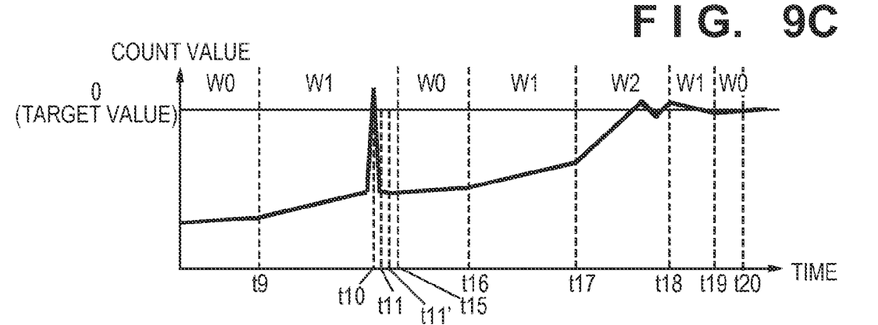

FIGS. 8C and 9C are timing charts in a case where the condition to shift to the first acceleration mode is satisfied (YES in step S5) in this comparative example and in a case where the condition to shift to the second acceleration mode is satisfied (YES in step S9). In FIGS. 8C and 9C, the same reference numerals as those described above in FIGS. 8A and 9A denote the same times.

As shown in FIGS. 8C and 9C, noise larger than that in FIGS. 8B and 9B is mixed in the current waveform during a time period between time t=t10 and t11, and the output from the comparator 43 goes high while the noise is mixed. The counter value is also influenced and becomes +100, unlike the counter value (−280 at t=t11 in FIG. 8A) when no noise is mixed.

Upon deciding a trace value in the next cycle of the PWM control signal at time t=t11, both the determinations in steps S4 and S5 of the flowcharts of FIGS. 7A and 7B become YES, and the provisional trace value Wpre=W1. The determination in step S8 becomes YES. However, the value of the storage unit 45 is 0FFF_FFFEh, the number of "1"s is 27, and thus the determination in step S9 becomes NO. Further, the determination in step S12 becomes NO, and the determination in step S13 also becomes NO, unlike the case in which no noise is mixed. The process advances to step S14 to set the final trace value to be W=−W1.

At time t=t11' when the output for one cycle has ended, the determination in step S5 becomes YES, the determination in step S9 becomes NO, and the final trace value becomes W=+W1. However, at next time t=t15, the value of the storage unit 45 becomes 3FFF_FF8Fh, both the determinations in steps S5 and S9 become NO, and the final trace value becomes the trace value W=W0 in the normal state.

At time t=t16 to t20 in FIG. 9C, the count value changes similarly to the case in which no noise is mixed, as represented at t=t9 to t14 in FIG. 9A. In this trace waveform, however, the timing is greatly delayed from that shown in FIG. 9A. That is, the target value trace time becomes much longer than that when no noise is mixed.

Figure 9D:
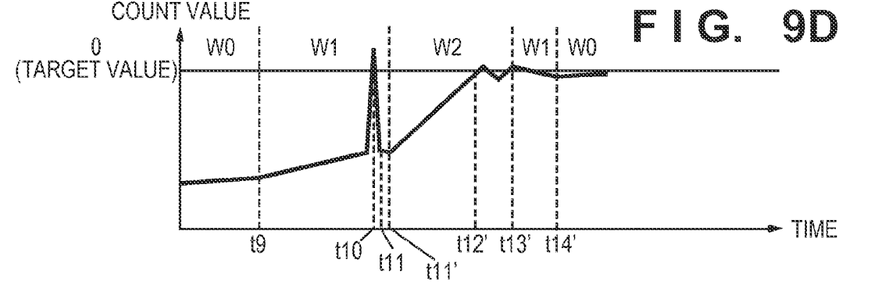

FIGS. 8D and 9D are timing charts when relatively large noise is mixed in the embodiment, similar to the case shown in FIGS. 8C and 9C. Also in this case, the same reference numerals as those described above in FIGS. 8A and 9A denote the same times.

As shown in FIGS. 8D and 9D, relatively large noise is mixed in the current waveform during a time period between time t=t10 and t11, similar to FIGS. 8C and 9C, and the output from the comparator 43 goes high while the noise is mixed. The counter value is also influenced and becomes +100, unlike the counter value (−280 at t=t11 in FIG. 8A) when no noise is mixed.

Upon deciding a trace value in the next cycle of the PWM control signal at time t=t11, both the determinations in steps S4 and S5 of the flowcharts of FIGS. 7A and 7B become YES, and the provisional trace value Wpre=W1. The determination in step S8 becomes YES. However, the value of the storage unit 45 is 0FFF_FFFEh, the number of "1"s is 27, and the determination in step S9 becomes NO. Further, the determination in step S12 becomes NO, and the determination in step S13 becomes NO, unlike the case in which no noise is mixed. The process thus advances to step S14 to set the final trace value to be W=−W1.

However, the noise is no longer mixed during the next cycle of time t=t11 to t11', and the final count value at time t=t11' becomes again a negative value of −280. At time t=t11', the value of the storage unit 45 becomes 1FFF_FFFDh, and the number of "1"s becomes 28. Therefore, the determination in step S9 of the flowcharts of FIGS. 7A and 7B becomes YES, and the final trace value in the next cycle becomes W=+W2.

At time t=t12' to t14' when the tendency is similar to one at time t=t12 to t14 described in FIG. 9A, the count value is asymptotic to the target value. In the case of FIG. 9D, compared to FIG. 9B, time t=t12' to t14' are delayed from time t=t12 to t14 by only one cycle of the PWM control signal.

As described above, in the embodiment, the tendency of an output from the comparator is checked during one cycle of the PWM control signal, and expressed as a code. Such codes are stored and held in the register for a predetermined number of cycles (32 cycles in this case).

Further, in the embodiment, the output tendency of the comparator in a relatively short period (first period) of past eight cycles that is stored in the register based on PWM control signals is checked. If there is a tendency where the count value is greater than the target value or there is a tendency where the count value is smaller than the target value, the high-level time of the PWM control signal is adjusted by using the larger trace value W1. If there is a balance between a case where the count value is greater than the target value and a case where the count value is smaller than the target value, the high-level time of the PWM control signal is adjusted by using the small trace value W0, or is maintained to be equal to that in the previous cycle.

In addition, the output tendency of the comparator in a relatively long period (second period) of past 24 cycles based on PWM control signals stored in the register is checked. If there is a significant tendency where the count value is greater than the target value or there is a significant tendency where the count value is smaller than the target value, the high-level time of the PWM control signal is adjusted by using the much larger trace value W2.

For descriptive convenience, W0, W1, and W2 will also be called the first trace value, second trace value, and third trace value, respectively.

According to the above-described embodiment, PWM control is performed using the output tendency of the comparator for the PWM control signal of one cycle. Even if relatively small noise is mixed, the code of the counter value used for PWM control is not influenced. Hence, the counter value can be asymptotic to the target value in the same time as that when no noise is mixed.

Even if noise large enough to influence the code of the counter value is mixed, the count value is asymptotic to the target value with a delay having only one cycle of the PWM control signal, compared to the case in which no noise is mixed. In this manner, stability against noise can be greatly improved while maintaining high-speed traceability, compared to the conventional technique.

The conventional technique performs complicated calculation and suffers a large circuit scale and poor accuracy owing to a calculation error of the CPU. However, the embodiment can reduce the calculation amount because no complicated calculation is performed. This greatly contributes to reducing the circuit scale of the calculation circuit and suppressing a decrease in accuracy caused by a calculation error. The storage area can also be reduced because not the counting result of the counter but only the code of the counting result is held.

Although the above-described embodiment has exemplified three trace modes, that is, the normal mode, first acceleration mode, and second acceleration mode. However, the present invention is not limited to this and is applicable to a control circuit having at least two modes.

Further, upon determining whether to shift from the normal mode to the acceleration mode, a heavier weight may be given to a code obtained at past time closer to the current time, than a code obtained at past time much earlier from the current time among codes stored in the storage unit 45. This can raise expectations for further improvement of the accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-266740, filed Dec. 5, 2012, which is hereby incorporated by reference herein in its entirety.

What is claimed is:

1. A printing apparatus which feeds a printing medium by driving a DC motor, and prints, comprising:
   a comparison unit configured to compare a current value of a current supplied to drive the DC motor with a target value for driving the DC motor by PWM control;
   a count unit configured to count a value representing a result of comparison by said comparison unit for a PWM control signal of one cycle;
   an encoding unit configured to check an output tendency of the result of comparison by said comparison unit based on a count value obtained by said count unit in every cycle of the PWM control signal, and encode the tendency as a code;
   a storage unit configured to store values of codes obtained by encoding by said encoding unit for a predetermined number of cycles of the PWM control signal; and
   a control unit configured to check values of codes stored in said storage unit in both a first period and a second period longer than the first period in regard to a past tendency of PWM control, adjust the PWM control signal, and control driving of the DC motor based on the adjusted PWM control signal.

2. The apparatus according to claim 1, wherein
said control unit checks, from values of codes stored in said storage unit for the first period, an output tendency of the value representing the result of comparison by said comparison unit,
in a case where there is a balance between a case where the current value is greater than the target value and a case where the current value is smaller than the target value, said control unit controls to adjust a high-level time of the PWM control signal by using a first trace value, or controls to maintain the high-level time to be equal to a high-level time in a previous cycle of the PWM control signal, and
in a case where there is a tendency where the current value is greater than the target value or in a case where there is a tendency where the current value is smaller than the target value, said control unit controls to adjust the high-level time of the PWM control signal by using a second trace value larger than the first trace value.

3. The apparatus according to claim 2, wherein
said control unit further checks, from values of codes stored in said storage unit for the second period, an output tendency of the value representing the result of comparison by said comparison unit, and
in a case where there is a significant tendency where the current value is greater than the target value or in a case where there is a significant tendency where the current value is smaller than the target value, said control unit controls to adjust the high-level time of the PWM control signal by using a third trace value larger than the second trace value.

4. The apparatus according to claim 1, wherein
said count unit adds "+1" in a case where the value representing the result of comparison by said comparison unit indicates that the current value is greater than the target value, and adds "−1" in a case where the value representing the result of comparison indicates that the current value is smaller than the target value, and
said encoding unit sets "0" as the code in a case where the count value obtained by said count unit is positive or 0, and "1" as the code in a case where the count value obtained by said count unit is negative.

5. The apparatus according to claim 4, wherein
said storage unit includes a register, and
said register sets the code obtained by said encoding unit at an LSB of said register, shifts a code already set in said register to an upper bit, and holds the code.

6. The apparatus according to claim 1, further comprising a detection unit configured to detect a current supplied to drive the DC motor,
wherein said detection unit includes a conversion unit configured to convert a value of the detected current into a voltage value.

7. The apparatus according to claim 1, wherein in case where said control unit checks values of codes stored in said storage unit for one of the first period and the second period, said control unit gives a heavier weight to a code obtained at past time closer to current time, than a code obtained at past time much earlier from the current time.

8. The apparatus according to claim 1, further comprising a driving unit configured to drive the DC motor by the PWM control and intermittently convey the fed printing medium, wherein said driving unit rotates the DC motor to feed the printing medium and apply back-tension to the printing medium.

9. The apparatus according to claim 1, wherein said count unit performs counting by using a predetermined reference clock.

10. The apparatus according to claim 1, further comprising an inkjet printhead configured to print by discharging ink to the printing medium.

11. A roll paper conveyance control method in a printing apparatus which includes a DC motor for feeding a printing medium, and drives the DC motor by PWM control to print on the fed printing medium, comprising:
comparing a current value of a current supplied to the DC motor with a target value for PWM control;
counting a value representing a result of the comparison for a PWM control signal of one cycle;
checking an output tendency of the result of comparison based on a count value in every cycle of the PWM control signal;
encoding the tendency as a code;
storing, in a storage unit, values of the encoded codes for a predetermined number of cycles of the PWM control signal; and
checking values of codes stored in the storage unit in both a first period and a second period longer than the first period in regard to a past tendency of PWM control to adjust the PWM control signal and control driving of the DC motor based on the adjusted PWM control signal.

12. The method according to claim 11, wherein
in the controlling, an output tendency of the value representing the result of comparison is checked from values of codes stored in the storage unit for the first period,
in a case where there is a balance between a case where the current value is greater than the target value and a case where the current value is smaller than the target value, a high-level time of the PWM control signal is controlled to be adjusted by using a first trace value, or the high-level time is controlled to be maintained to be equal to a high-level time in a previous cycle of the PWM control signal, and
in a case where there is a tendency where the current value is greater than the target value or in a case where there is a tendency where the current value is smaller than the target value, the high-level time of the PWM control signal is controlled to be adjusted by using a second trace value larger than the first trace value.

13. The method according to claim 12, wherein
in the controlling, an output tendency of the value representing the result of comparison is further checked from values of codes stored in the storage unit for the second period, and
in a case where there is a significant tendency where the current value is greater than the target value or in a case where there is a significant tendency where the current value is smaller than the target value, the high-level time of the PWM control signal is controlled to be adjusted by using a third trace value larger than the second trace value.

14. The method according to claim 11, wherein
in the counting, "+1" is added in a case where the value representing the result of comparison indicates that the current value is greater than the target value, and "−1" is added in a case where the value representing the result of comparison indicates that the current value is smaller than the target value, and in the encoding, "0" is set as the code in case where the count value is positive or 0, and "1" is set as the code in a case where the count value is negative.

15. The method according to claim 14, wherein
the storage unit includes a register, and
the register sets the code obtained by the encoding at an LSB of the register, shifts a code already set in the register to an upper bit, and holds the code.

16. The method according to claim 11, further comprising:
detecting a current supplied to drive the DC motor; and
converting a value of the detected current into a voltage value.

17. The method according to claim 11, wherein in the controlling, in case where values of codes stored in the storage unit are checked for one of the first period and the second period, a heavier weight is given to a code obtained at past time closer to current time, than a code obtained at past time much earlier from the current time.

* * * * *